United States Patent Office 3,338,711
Patented Aug. 29, 1967

3,338,711
PROCESS FOR FORMING AZO DYE
PHOTOGRAPHIC IMAGES
Otto Boes, Neu-Isenburg, Germany, assignor to E. I. du Pont de Nemours and Company, Wilmington, Del., a corporation of Delaware
No Drawing. Filed Sept. 27, 1963, Ser. No. 311,983
Claims priority, application Germany, Nov. 15, 1962, A 41,634
9 Claims. (Cl. 96—49)

This invention relates to a process for forming photographic images in the form of light-stable dyes and more particularly in the form of azo dyes.

With the photographic films and papers now on the market the production of color photographs is accomplished almost exclusively by the chromogenic development method. This process yields azomethine or quinoneimine dye images, but most of them are deficient in light fastness or have unfavorable absorption properties. In particular, this is very disagreeably noticeable in the azomethine dyes, which make up the magenta and yellow partial image.

A few other processes are known in the art, in which azo dyes are used to form the image. These azo dyes are free from the defects mentioned above, and in addition they yield color images of great brilliance. The most familiar of these processes is the silver dye bleach method, of which probably the chief disadvantage is that it is not suitable for taking snapshots. Since colored layers are present even during exposure, and they act practically like filters, the sensitivity of the material is so low that it can serve only for copying purposes. Another disadvantage is that in many cases the decomposition of the azo dyes by the bleaching bath forms colored degradation products, and moreover that only a fraction of the known dyes can be so thoroughly bleached in the customary baths that pure whites are produced.

The literature has already reported processes in which the azo dye image is produced in the film itself from colorless intermediates, so that use of a special bleaching bath is eliminated. Thus, for example, U.S.P. 2,514,233 and U.S.P. 2,361,541 disclose a process in which films containing a suitable azo coupling reagent and a diazotizable amine are treated with an acidified nitrite solution. This produces a dye image in silver-free areas, while the diazonium compound is decomposed at points containing silver.

A similar process forms the subject matter of U.S.P. 2,271,176. In this case the film, which contains a suitable azo coupling reagent, is treated with a strongly acidic diazonium salt solution. Under the action of the acid the diazonium salt is decomposed at the silver image points. Afterwards, therewith the pH value is increased, so that coupling to form a dye can occur in silver-free areas. But none of these processes has been completely satisfactory. Aside from the fact that acidified nitrite solutions are not sufficiently stable, many azo coupling reagents will themselves react with the acidified nitrite solution and so are not applicable to this method.

Moreover, the strongly acidic baths have unfavorable effects on the properties of the photographic film.

Finally, a method has become known in the art in which a coupling reagent is added to the emulsion, whereupon the emulsion is exposed, developed and fixed and the coupling reagent is coupled with a diazonium salt in the presence of a heavy metal salt. By reason of the action of such a salt the dye forms only at points which are free from metallic silver. Even this method has only limited applicability since, as is known to every one who is skilled in the art, the presence of a heavy metal salt has a deteriorating effect on the stability of diazonium salt solutions.

According to the present invention, azo dye images are obtained by treating a photographic layer containing a silver image with a diazonium solution containing bromide, iodide or thiocyanate ions. The azo dye is thus formed in the reverse areas free of silver image. These reverse areas may be fixed and free from silver halide or may contain silver halide. These ions have the effect of preventing azo coupling, and hence dye formation, at points containing metallic silver, permitting dye formation only in silver-free areas. The silver and any silver halide is then removed leaving an azo dye image in the layer.

If, however, the same photographic film is treated with an otherwise identical diazonium solution but in absence of the specified ions, then no picture image is obtained depending on the density of silver, but only a uniformly colored film. In contrast with the bromide, iodide or thiocyanate ions, chloride ions give this effect only in slight degree.

The advantages of the process disclosed by us are obvious. Thus, diazonium salt solutions containing bromide, iodide or thiocyanate ions are characterized by good stability so that the process can be carried out even on a commercial scale. Moreover, use of a strong acid is obviated, which greatly broadens the practical versatility of the process. The bromide, iodide or thiocyanate ions are preferably added to the diazonium salt solution in the form of their alkali metal salts. Solutions are employed which contain, for example, 20–30 g. potassium bromide per liter of solution. About the same effect is given by adding 2 g. potassium iodide to 1 liter of diazonium solution. Results are particularly good in these cases if a wetting agent is added to the diazonium salt solution.

Practically all coupling reagents and diazonium salts which are capable of azo coupling are suitable for this process, so that azo dyes are available in great numbers for achieving any desired tint. For reasons of technical operation it is particularly desirable here to employ stable diazonium salts. Diazosulfones have proved to be particularly suitable.

For example, the compounds listed in Table I are usable.

The substances listed here are in every instance stable solid compounds which are easy to dissolve for use. Insofar as these substances contain acidic groups they are water-soluble. Compounds containing no acidic groups are dissolved in water by adding water-miscible organic solvents, e.g., alcohols.

The compounds listed in Table II, for example, have proved to be suitable azo coupling reagents.

All of the cited coupling reagents contain groups suited to azo coupling, and also substituents which inhibit diffusion into the photographic film. To the extent that these compounds contain water-solubilizing groups they may be added in the usual manner to the photosensitive emulsion in aqueous solution. Otherwise they are dissolved in a manner known in the art in suitable solvents and emulsified with aqueous gelatin solutions. These emulsions are then cast together with the photosensitive film.

The process according to this invention is further characterized by the fact that it can be combined with the method of chromogenic development or with other processes forming part of the state of the art. It is a familiar fact that difficulties are still encountered when using colorless films in bringing out the blue-green partial image in satisfactory quality by means of azo dyes, since hitherto no usable monoazo dyes were available for the purpose.

But the present process makes it possible to make a multiple-layer film in which magenta and yellow partial images are produced by the process disclosed herein, while the blue-green partial image may be brought out, for example, by the chromogenic development method. A multicolor photograph made in this way has color images of utmost brilliance and good light-stability.

The process according to this invention may be illustrated in more exact detail by the following examples wherein anhydrous ingredients are used and they are added to one liter of water. The silver halide is silver bromide/iodide unless otherwise stated.

EXAMPLE 1

A gelatino-silver bromoiodide emulsion, containing azo dye coupling reagent No. 1 of Table II, is coated on a film base in the usual way. The substance is exposed, and processed as follows:

(1) Developed for 10 minutes in the following developer at 20° C.:

1 liter water
1 g. sodium hexametaphosphate
3 g. N-methyl-p-aminophenol hydrosulfate
45 g. sodium sulfite
6 g. hydroquinone
40 g. sodium carbonate
2 g. potassium bromide.

(2) Treated for 5 minutes in the following stop bath:

1 liter water
50 g. sodium acetate·$3H_2O$
6 ml. glacial acetic acid.

(3) Washed with water for 10 minutes.
(4) Treated for 5 minutes in a diazonium bath having the composition:

1 liter water
3 g. diazosulfone No. 1 of Table I
25 g. sodium acetate·$3H_2O$
25 g. potassium bromide
2 ml. glacial acetic acid
0.2 g. N-methyloleyltaurine.

(5) Washed with water for 10 minutes.
(6) Treated 7 minutes in the following bath to bleach out the silver:

1 liter water
50 g. potassium ferricyanide
10 g. potassium bromide.

(7) Washed with water for 5 minutes.
(8) Fixed in 20% sodium thiosulfate solution for 5 minutes.
(9) Washed with water for 15 minutes, then dried.

A yellow reverse image is obtained.

If diazosulfone No. 1 is replaced in the diazonium bath by another of the diazosulfones listed in Table I, Nos. 2–11, then a yellow positive image somewhat different in color character is obtained. The same is true when one of the dye coupling reagents listed in Table II under Nos. 2–12 is added to the silver halide emulsion instead of dye coupling reagent No. 1.

EXAMPLE 2

The process of Example 1 is repeated except that the diazonium bath is replaced by the following:

1 liter water
3 g. diazosulfone No. 1 of Table I
25 g. sodium acetate·$3H_2O$
2 g. potassium iodide
2 ml. glacial acetic acid
0.1 g. N-methyloleyltaurine.

Practically the same yellow positive image is obtained as in Example 1.

EXAMPLE 3

A gelatino-silver chloride emulsion containing dye coupling reagent No. 15 is coated in the usual way on a film base. A film strip of this material is exposed and then processed as follows:

(1) Developed (black-and-white) for 10 minutes, in the developer of Example 1.
(2) Treated in the stop bath of Example 1, 5 minutes.
(3) Washed in water for 10 minutes.
(4) Treated 1 minute with a diazonium bath having the following composition:

Solution A—

500 ml. glycol monomethyl ether
5 g. diazosulfone No. 13 of Table I.

Solution B—

500 ml. water
25 g. sodium acetate·$3H_2O$
25 g. potassium bromide
2 ml. glacial acetic acid
1 g. N-hexadecyltrimethylammonium bromide.

For use, solutions A and B are mixed and the resulting solution is filtered.

(5) Washed in water 10 minutes.
(6) The film strip is then bleached and fixed as in Example 1, to remove the silver and silver salts.

A positive image, magenta in color, is obtained.

EXAMPLE 4

A film strip is prepared which is coated with a gelatino-silver halide emulsion containing one of the dye coupling reagents listed under Nos. 13–18 in Table II. The material is then treated as specified in Example 1 or 2. Red to purple positive images are obtained, depending on the coupling reagent employed.

The following examples demonstrate the possibility of combining the present process with the chromogenic development processes known in the art.

EXAMPLE 5

A film strip is prepared in a manner known in the art, and on it the following layers are coated in the stated sequence:

(1) Red-sensitized gelatino-silver halide layer containing the dye coupling reagent 1-hydroxy-2-N-octadecyl-naphthamide-4-sulfonic acid.
(2) Green-sensitized gelatino-silver halide layer containing dye coupling reagent No. 15.
(3) Yellow filter layer.
(4) Unsensitized gelatino-silver halide layer containing dye coupling reagent No. 1.
(5) Gelatin protective layer.

This material is exposed and then processed as follows:

(1) Developed (black-and-white) 10 minutes, in the developer of Example 1.
(2) Washed in water 10 minutes.
(3) Exposed to red light from the back of the film, 1 minute.
(4) Color developed, 10 minutes, in a developer of the following composition:

1 liter water
1 g. hydroxylamine hydrochloride
10 ml. hexyleneglycol
0.8 g. N-benzyl-p-aminophenol hydrochloride
3.5 g. N-diethyl-p-phenylenediamine hydrochloride
2 g. potassium bromide
15 g. sodium sulfite
40 g. trisodium phosphate·12 $H_2O$.

(5) Treated, 5 minutes, in the stop bath of Example 1.
(6) Washed in water, 10 minutes.
(7) Treated in the following diazonium bath, 5 minutes:

1 liter water
4.5 g. diazosulfone No. 7—Table I
4.5 g. naphthalenedisulfonic acid
25 g. sodium acetate·3H₂O
25 g. potassium bromide
20 g. magnesium sulfate
1 ml. glacial acetic acid
0.2 g. N-methyloleyltaurine.

(8) Washed in water, 10 minutes.
(9) Bleached and fixed as in Example 1.

A positive image in natural colors is obtained. In this material the bottom layer contains a blue-green quinoneimine dye and the green-sensitive or blue-sensitive layers contain, respectively, a purple or a yellow azo dye.

The same result can be obtained if a red-sensitized silver halide layer is used in the same film material and with the same treatments, the dye-coupling reagent cited above being replaced by 1-hydroxy-2-N-octadecylnaphthamide as the emulsified dye coupling reagent. For this purpose, the coupling reagent is dissolved in a high-boiling water-immiscible organic solvent and the solution is emulsified in an aqueous gelatin solution. This emulsion is then coated along with the gelatino-silver halide emulsion.

EXAMPLE 6

A film strip is made of the same material as in Example 5, excepting that no dye coupling reagent is added to the red-sensitized bottom layer. This material is exposed and processed as in Example 5. Instead of the dye developer employed there, development is effected by treating 14 minutes in the following dye developer:

Solution A—

800 ml. water
8 g. sodium sulfite
2.5 g. 2-amino-5-diethylaminotoluene hydrochloride
2 g. potassium bromide
4 ml. 0.5% potassium iodide solution
3 g. potassium thiocyanate
20 g. sodium carbonate.

Solution B—

100 ml. water
1.2 g. hydroquinone
1.8 g. 2,6-dibromo-1,5-dihydroxynaphthalene.

For use, solutions A and B are mixed.
A positive image in natural colors is obtained.

Table I (1) 4-sodiumsulfobenzenediazophenylsulfone
(2) 4-sodium sulfobenzenediazoethylsulfone
(3) 3-sodium sulfobenzenediazophenylsulfone
(4) 4-sodium sulfomethylbenzenediazophenylsulfone
(5) 4-carboxymethoxybenzenediazophenylsulfone
(6) 4-(γ-sulfopropoxy)benzenediazophenylsulfone
(7) 3-sodium sulfo - 4 - methoxybenzenediazophenylsulfone
(8) 2-methyl - 4 - methoxy-5-sodium sulfobenzenediazophenylsulfone
(9) 2-methyl - 4 - methoxy-5-sodium sulfobenzenediazo-4'-methylphenylsulfone
(10) 3,6-disodium sulfo-1-naphthalenediazophenylsulfone
(11) 6-sodium sulfo-2-naphthalenediazophenylsulfone
(12) benzenediazophenylsulfone
(13) 4-methoxybenzenediazophenylsulfone
(14) 4-chlorobenzenediazophenylsulfone
(15) 3,5-dimethyl-4-pyrazolediazophenylsulfone.

Table II (1) m-(N-[γ-sulfopropyl])aminostearanilide
(2) 2-stearoxy-5-(m-aminophenylcarbamyl)-benzene sulfonic acid
(3) p-stearoylamido-N-(m-[γ-sulfopropylamino])phenylbenzenesulfonamide
(4) p-stearoylamido-N-m-dimethylaminophenylbenzenesulfonamide
(5) p-stearoylamido-N-m-aminophenylbenzenesulfonamide
(6) Z-stearoxy-5-(m-hydroxyphenylcarbamyl)-benzene sulfonic acid
(7) N-stearyl-α-naphthylamine
(8) 1-(x-sulfo-4-methoxyphenyl)-3-heptadecyl-5-pyrazolone
(9) 1-(5-sulfo-2-phenoxyphenyl)-3-heptadecyl-5-pyrazolone
(10) 1-(stearoylamidophenyl)-3-carboxy-5-pyrazolone
(11) 1-(2,4,6-trichlorophenyl)-3-heptadecyl-5-pyrazolone
(12) 1-(2,4,6-trichlorophenyl)-3-stearoylamido-5-pyrazolone
(13) N-(p-[α-N'-3,5-dicarboxyphenyl-N'-stearylcarbamyl]-methoxyphenyl)-3-hydroxy-2-naphthamide
(14) 3-(1-hydroxy-2-naphthamido)-4-N-methyl-N-stearyl-benzene sulfonic acid
(15) 1-hydroxy-8-stearoylamido-3,6-naphthalene disulfonic acid
(16) 1-hydroxy-8-stearoylamido-3,5-naphthalene disulfonic acid
(17) 1-hydroxy-8-p-stearoxybenzamido-3,6-naphthalene disulfonic acid
(18) 1-hydroxy-8-p-stearoxybenzamido-3,5-naphthalene disulfonic acid.

Suitable compounds that will provide the ions referred to above include sodium and potassium chloride, bromide, iodide and thiocyanate, which are illustrated in the examples. Other useful compounds include the corresponding calcium, magnesium, strontium and barium salts.

The invention is not limited to the use of photographic gelatino-silver halide emulsions of the silver iodo-bromide type. The invention may be applied to other gelatino-silver halide emulsions, e.g., gelatino-silver bromochloride emulsions of the lithographic type as well as silver bromide emulsions. The emulsions can contain binding agents other than gelatin or mixtures of gelatin and such binding agents. Suitable binding agents include polyvinyl alcohol and acetals thereof, polyvinyl pyrrolidone, polyvinyl lactams, cellulose esters, dextrin and dextran, the latter two being mixed with gelatin.

Various suitable examples of useful gelatino-silver halide emulsions and color formers useful therein are disclosed in Middleton and Jennings U.S. 2,319,426, Dorough U.S. 2,380,032, Dorough U.S. 2,380,033 and Woodward & Chu U.S. 2,927,024.

The emulsions may contain any of the well-known optical sensitizing dyes as well as non-optical sensitizers such as sulfur sensitizers containing labile sulfur, e.g., allyl isothiocyanate, allyl diethyl thiourea, phenyl isothiocyanate and sodium thiosulfate, the polyoxyalkylene ethers in Blake et al., U.S. 2,400,532, and the polyglycols disclosed in Blake et al., U.S. 2,432,549. Other non-optical sensitizers such as amines as taught by Staud et al., U.S. 1,925,508, and metal salts as taught by Baldsiefen et al., U.S. 2,540,086, may also be used. Antifoggants, e.g., benzotriazole and triazaindenes, can be used as well as the usual hardeners, i.e., chrome alum, formaldehyde, etc.

The emulsion may be coated on any suitable support such as paper or films composed of cellulose esters, e.g., cellulose triacetate, cellulose acetate/butyrate; superpolymers, e.g., polyvinyl chloride (co) vinyl acetate; polyvinyl acetals, e.g., formals, acetals; polystyrene; polyamides, e.g., polyhexamethylene adipamide, and polyesters, e.g., polyethylene terephthalate, polyethylene terephthalate/isophthalate, esters formed by condensing terephthalic acid and dimethyl terephthalate with propylene glycol, diethylene glycol, tetramethylene glycol or cyclohexane-1,4-dimethanol (hexahydro-p-xylene alcohol). The vinylidene chloride copolymer-coated oriented polyester films of Alles U.S. 2,779,684 are especially suitable.

An advantage of this invention is that it provides a simple and practical process for producing azo dye images. Another advantage is that the reversal process can be carried out by the photographic technician and yields azo dye images having good light fastness and forms brilliant images free from unfavorable absorption properties. Additional advantages are that the process described can be combined with one of chromogenic development.

I claim:

1. A process for producing azo dye images in a photographic layer, containing a component capable of azo coupling, and at least one silver image, characterized in that these layers are treated with a solution of a diazonium compound capable of coupling, said solution being free from strong acid and initially containing bromide, iodide or thiocyanate ions, whereby an azo dye image is formed in the non-silver image areas.

2. A process according to claim 1, characterized in that diazosulfones are used as the diazonium compounds which are capable of coupling.

3. A process according to claim 1, characterized in that potassium bromide is initially present in an amount of 20–30 grams per liter of the solution of the diazonium compound which is capable of coupling.

4. A process according to claim 1, wherein a plurality of image-yielding layers is present.

5. A process according to claim 1, wherein the layer is a gelatin layer.

6. A process according to claim 1, characterized in that a wetting agent is added to the solution of the diazonium compound which is capable of coupling.

7. In a process for making polychrome images the step of producing at least one partial image in accordance with the process defined in claim 1.

8. A process for producing azo dye images in a photographic layer containing a component capable of azo coupling and at least one silver image, characterized in that these layers are treated with a solution of a diazonium compound capable of coupling, said solution being free from strong acid and containing sodium, potassium, calcium, magnesium, strontium or barium bromide, iodide or thiocyanate to provide bromide, iodide or thiocyanate ions, whereby an azo dye image is formed in the non-silver image areas without further treatment.

9. A process according to claim 8 wherein the silver and any silver halide is removed from the layer leaving an azo dye image in said layer.

References Cited
UNITED STATES PATENTS

| | | | |
|---|---|---|---|
| 2,271,176 | 1/1942 | Gaspar | 96—54 |
| 2,297,732 | 10/1942 | Woodward | 96—9 |
| 2,333,126 | 11/1943 | Schwarc | 96—54 |
| 2,342,620 | 2/1944 | Woodward | 96—9 |
| 2,376,822 | 5/1945 | Schneider et al. | 96—54 |
| 2,465,760 | 3/1949 | Sprung et al. | 96—91 |
| 2,633,422 | 3/1953 | Jennings | 96—9 |

NORMAN G. TORCHIN, *Primary Examiner.*

J. TRAVIS BROWN, *Examiner.*